United States Patent
Suermondt et al.

(10) Patent No.: US 6,701,333 B2
(45) Date of Patent: Mar. 2, 2004

(54) METHOD OF EFFICIENT MIGRATION FROM ONE CATEGORIZATION HIERARCHY TO ANOTHER HIERARCHY

(75) Inventors: Henri Jacques Suermondt, Sunnyvale, CA (US); George Henry Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 294 days.

(21) Appl. No.: 09/908,388

(22) Filed: Jul. 17, 2001

(65) Prior Publication Data

US 2003/0018658 A1 Jan. 23, 2003

(51) Int. Cl.$^7$ .............................................. G06F 17/30
(52) U.S. Cl. ..................... 707/204; 707/200; 707/1; 707/2; 707/3; 707/4
(58) Field of Search ............... 707/1, 10, 100, 707/101, 103, 104, 202, 203, 204, 205, 2, 3, 4, 5, 6, 9, 102, 103 R, 104.1, 200; 704/7; 709/223, 224, 228, 229, 236, 246

(56) References Cited

U.S. PATENT DOCUMENTS 6,233,546 B1 * 5/2001 Datig ........................... 704/7
6,301,579 B1 * 10/2001 Becker ...................... 707/102

* cited by examiner

*Primary Examiner*—Shahid Alam
*Assistant Examiner*—Fred Ehichioya (57) ABSTRACT

A method of efficiently migrating data from one categorization hierarchy to a new hierarchy. A mapping is created which describes where a document in one hierarchy will be placed in a new hierarchy. The classifier of the first hierarchy is merged with this mapping to act as a classifier for the second hierarchy. Cases from the first hierarchy are classified in the new hierarchy using this merged mapping. In another embodiment, a training set is designated from a first hierarchy and mapped to a second hierarchy. Using machine learning, a classifier for the second hierarchy is derived and used to classify subsequently migrated cases. Migration of data using the present invention is more accurate as fewer human errors are generated. The present invention can act as a virtual classifier for multiple hierarchies in an organization, providing updated categorization information for multiple hierarchical databases.

21 Claims, 7 Drawing Sheets

FIGURE 1A

(PRIOR ART)

FIGURE 1B

(PRIOR ART)

METHOD OF EFFICIENT MIGRATION FROM ONE CATEGORIZATION HIERARCHY TO ANOTHER HIERARCHY

BACKGROUND OF THE INVENTION

1. Field of the Invention

The present invention relates to the field of categorization of items in general. More specifically, the present invention relates to the categorization of cases, such as documents, in a topic category within a hierarchical organization of cases.

2. Prior Art

With the increased amounts of data being generated, stored, and processed today, it is increasingly important for organizations to maintain their databases (e.g., collections of documents such as a customer support knowledge base) in an orderly manner. Many organizations rely on hierarchical schemes to organize their databases. A hierarchical organization of data utilizes successive levels of sub-categories which further narrow the scope of a category until a particular case (e.g., a document, file, program, etc.) is identified in the hierarchy. The advantage of such a system is that the hierarchy is easily navigated, even by users who are not expert with a particular database.

One problem with such a system is the reclassification of cases in a database hierarchy after changes to such a hierarchy. Organizations may decide that it is necessary to change their classification scheme to better suit their needs. For example, this can be the result of wanting to make the database easier to navigate, creating new categories, merging categories, splitting old categories, or moving cases between categories. The reclassification of cases afterwards can often require as much effort as the original classification process and may be complicated by the fact that a single case can belong in multiple categories.

The worst case scenario of how to cope with these hierarchy changes would be to classify items into the new hierarchy, without leveraging any information about the old classification of items. Another method is to manually reclassify only those cases that are affected by the changes to the hierarchy (e.g. moving batches of cases from one category to another one). If the changes are simple enough, such as renaming a category or creating a new category with no items in it, no reclassification is needed. However, most changes require much more effort and are difficult to implement. If this reclassification is performed manually, the possibility of mis-classification can be a problem. The database hierarchies can contain millions of cases and anyone reclassifying cases would require expert level knowledge of the entire new hierarchy to correctly perform their task. There is a need for a solution that facilitates the migration of cases when changes are made to a hierarchy.

These problems are magnified in organizations that maintain multiple hierarchical databases containing similar information. These organizations may maintain separate hierarchies for a variety of reasons. For example, an organization may find accessing particular data more efficient when a variety of hierarchical schemes are employed rather than just one. In one hierarchy, cases may be organized according to the operating system they pertain to. Another hierarchy may organize cases according to what application they reference. Although such hierarchies are separate, there may be relationships among them. The same solution that helps with changes to a hierarchy can also be applied to use classification in one hierarchy to facilitate classification in another.

Figure 1A:
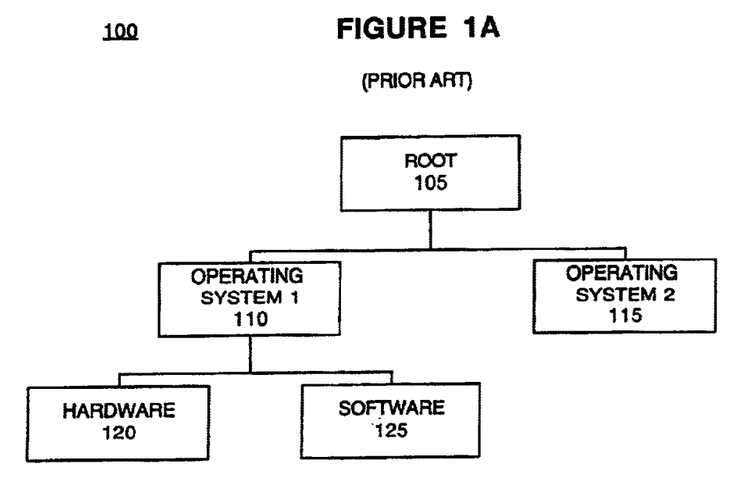
FIGS. 1A and 1B are block diagrams of exemplary data hierarchies showing how similar sets of data may be stored using different hierarchical schemes.
Figure 1B:
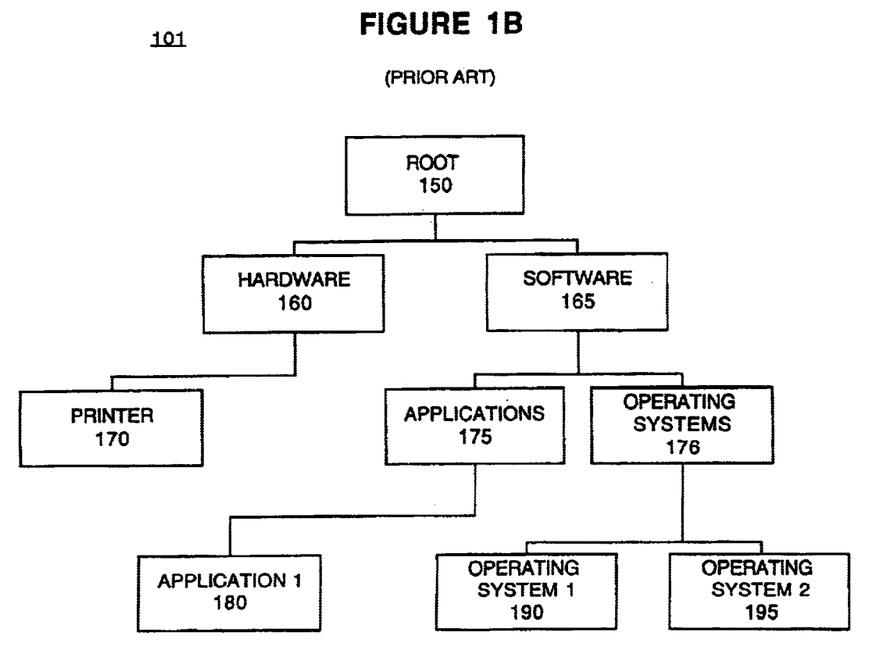

FIGS. 1A and 1B illustrate exemplary data hierarchies 100 and 101 used to organize data (e.g., business metrics, transformed data, and raw data) and information in an organization utilizing separate hierarchies. In FIG. 1A, a hierarchical database 100 has a root level directory 105 containing two sub categories: operating system 1 (110) and operating system 2 (115). Operating system 1 has further sub-categories of hardware 120 and software 125.

In FIG. 1B, database 101 has a root level directory 150 containing two sub categories: hardware 160 and software 165. Hardware 160 has been further sub categorized with a category for printers 170. Software 165 has been further divided into a categories for applications 175 and operating systems 176. Application 180 is a sub-category of applications 175, while operating system 1 and operating system 2 (190 and 195 respectively) are sub-categories of operating systems 176.

Hierarchy 100 represents a hierarchical scheme currently used by an organization. Hierarchy 101 represents a new hierarchical scheme that the organization is moving to, or one of a number of hierarchies used simultaneously by an organization. The data in both hierarchies is organized utilizing successive levels of sub-categories which further narrow the scope of a category until a particular case is identified in the hierarchy. For example the user can navigate through hierarchical organization 101 by selecting an item from the top-level menu (e.g., either "hardware" or "software"). The user can then make further selections at each subsequent level of hierarchical organization 101. After selecting "software," a user can then select "applications" or "operating systems." The user can move backwards or forwards (up or down) in hierarchical organization 101; for example, from "operating systems," the user can move back up to "software", or to "operating system 1", or "operating system 2."

Accordingly, what is needed is a method of efficiently migrating data from one categorization hierarchy to another hierarchy. A further need exists for a method which meets the above need and allows categorization information to be shared among a plurality of related hierarchies such that the categorization of an item in one hierarchy is leveraged to facilitate the categorization of that item and others in another hierarchy.

SUMMARY OF THE INVENTION

The present invention facilitates efficient migration of data from one categorization hierarchy to another hierarchy. It can determine the best category in a new hierarchy for cases previously classified in an old hierarchy and can automatically derive a classifier for the new hierarchy to classify new items. The present invention can be used as a "virtual" classifier by combining classifiers for a plurality of related hierarchies. Classifications made in one categorization hierarchy (e.g., adding, deleting, or moving a document to a different category) are updated across the plurality of related hierarchies and can be used to help classify other documents in the related hierarchies as well.

Embodiments of the present invention are directed to a method of efficiently migrating data from one categorization hierarchy to a new hierarchy. Data, item, document, and/or case refer to any file, document, program, raw or processed data, or any information which may be contained in a data hierarchy. A mapping is created which describes where the cases in one hierarchy will be placed in a new hierarchy. The classifier of the first hierarchy is merged with this mapping to act as a classifier for the second hierarchy. Cases from the first hierarchy are classified in the new hierarchy using this merged mapping. In another embodiment, a training set of classified items is designated from a first hierarchy and mapped to a second hierarchy. Using machine learning, a classifier for the second hierarchy is created and used to classify subsequently migrated cases.

Migration of data using the present invention requires much less human effort, and is likely to be more accurate than manual reclassification. Induced classifiers via machine learning technology are directly dependent on how large a training set is available, and the present invention provides a way to transfer the old training set to the new hierarchy, reducing the cost and delay to obtain a new training set sufficiently large to accurately induce a classifier.

The present invention can act as a virtual classifier for multiple hierarchies in an organization, providing updated categorization information for multiple hierarchical databases. Cases classified in one hierarchy are used to help classify those cases in all of the other hierarchies to which a mapping exists. For example, if a domain expert makes a single classification in one hierarchy, that item can expand the training set used for all related hierarchies, thereby improving the accuracy of the derived classifiers for those hierarchies.

BRIEF DESCRIPTION OF THE DRAWINGS

The accompanying drawings, which are incorporated in and form a part of this specification, illustrate embodiments of the present invention and together with the description, serve to explain the principles of the invention.

DETAILED DESCRIPTION

Notation and Nomenclature

A method for migrating data between hierarchical databases is described. While numerous details are set forth in order to provide a thorough understanding of the present invention, it should be understood that it is not intended to limit the invention to this particular embodiment alone. On the contrary, the invention is intended to cover alternatives, modifications, and equivalents, which may be included within the spirit and scope of the invention as defined by the appended claims. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "creating," "merging," "deriving," "migrating," "classifying," "assigning" or the like, can refer to the actions and processes (e.g., method 400, 600, and 700 of FIGS. 4, 6, and 7 respectively) of a computer system or similar electronic computing device. The computer system, or similar electronic computing device, manipulates and transforms data represented as physical (electronic) quantities within the computer system's registers and memories into other data similarly represented as physical quantities within the computer system memories or registers or other such information storage, transmission, or display devices.

Figure 2:
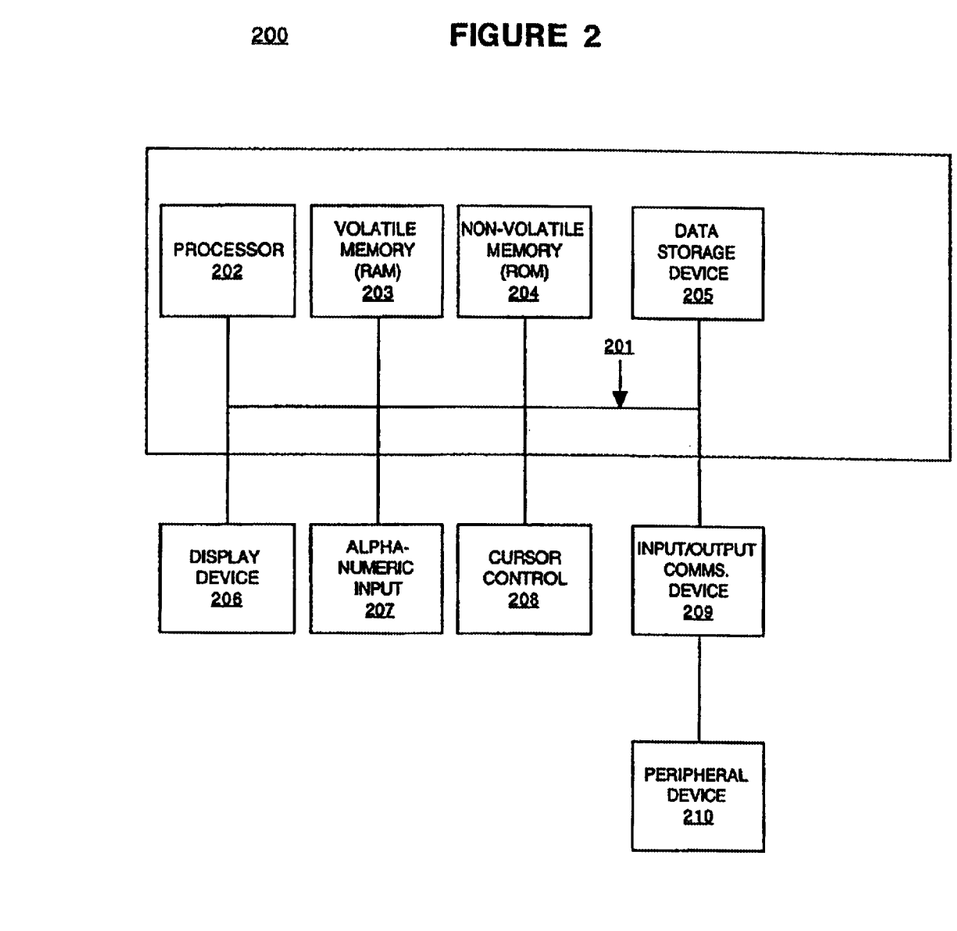
FIG. 2 is a block diagram illustrating an exemplary computer system upon which embodiments of the present invention may be practiced.

With reference to FIG. 2, portions of the present invention are comprised of computer-readable and computer-executable instructions that reside, for example, in computer system 200 which can be used as a part of a general purpose computer network. It is appreciated that computer system 200 of FIG. 2 is exemplary only and that the present invention can operate within a number of different computer systems including general-purpose computer systems, embedded computer systems, laptop computer systems, hand-held computer systems, and stand-alone computer systems.

In the present embodiment, computer system 200 includes an address/data bus 201 for conveying digital information between the various components, a central processor unit (CPU) 202 for processing the digital information and instructions, a volatile main memory 203 comprised of volatile random access memory (RAM) for storing the digital information and instructions, and a non-volatile read only memory (ROM) 204 for storing information and instructions of a more permanent nature. In addition, computer system 200 may also include a data storage device 205 (e.g., a magnetic, optical, floppy, or tape drive or the like) for storing vast amounts of data. It should be noted that the software program for performing the data migration method of the present invention can be stored either in volatile memory 203, data storage device 205, or in an external storage device (not shown).

Devices which are optionally coupled to computer system 200 include a display device 206 for displaying information to a computer user, an alphanumeric input device 207 (e.g., a keyboard), and a cursor control device 208 (e.g., mouse, trackball, light pen, etc.) for inputting data, selections, updates, etc. Computer system 200 can also include a mechanism for emitting an audible signal (not shown).

Referring still to FIG. 2, optional display device 206 of FIG. 2 may be a liquid crystal device, cathode ray tube, or other display device suitable for creating graphic images and alpha-numeric characters recognizable to a user. Optional cursor control device 208 allows the computer user to dynamically signal the two dimensional movement of a visible symbol (cursor) on a display screen of display device 206. Many implementations of cursor control device 208 are known in the art including a trackball, mouse, touch pad, joystick, or special keys on alpha-numeric input 207 capable of signaling movement of a given direction or manner of displacement. Alternatively, it will be appreciated that a cursor can be directed and/or activated via input from alpha-numeric input 207 using special keys and key sequence commands. Alternatively, the cursor may be directed and/or activated via input from a number of specially adapted cursor directing devices.

Furthermore, computer system 200 can include an input/output (I/O) signal unit (e.g., interface) 209 for interfacing with a peripheral device 210 (e.g., a computer network, modem, mass storage device, etc.). Accordingly, computer system 200 may be coupled in a network, such as a client/server environment, whereby a number of clients (e.g., personal computers, workstations, portable computers, minicomputers, terminals, etc.) are used to run processes for performing desired tasks (e.g., inventory control, payroll, billing, etc.).

Figure 3:
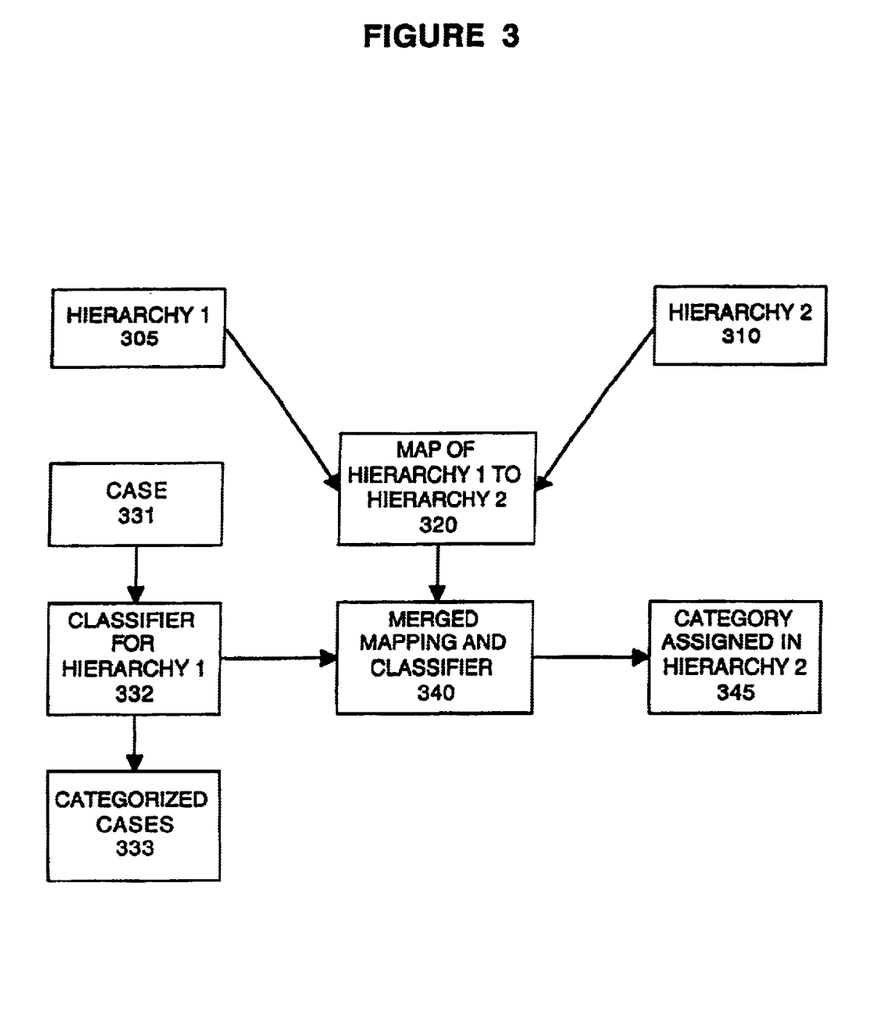
FIG. 3 is a block diagram illustrating components used in a method for migrating data from one categorization hierarchy to another hierarchy in accordance with one embodiment of the present invention.

FIG. 3 is a block diagram showing various components involved in migrating data from one categorization hierarchy to another hierarchy in accordance with embodiments of the present invention. For purposes of clarity, the following discussion will utilize the block diagram of FIG. 3 in conjunction with flow chart 400 of FIG. 4, to clearly describe one embodiment of the present invention. As will be described in detail below, the method of the present invention deals with efficient migration from one categorization hierarchy to another hierarchy.

Figure 4:
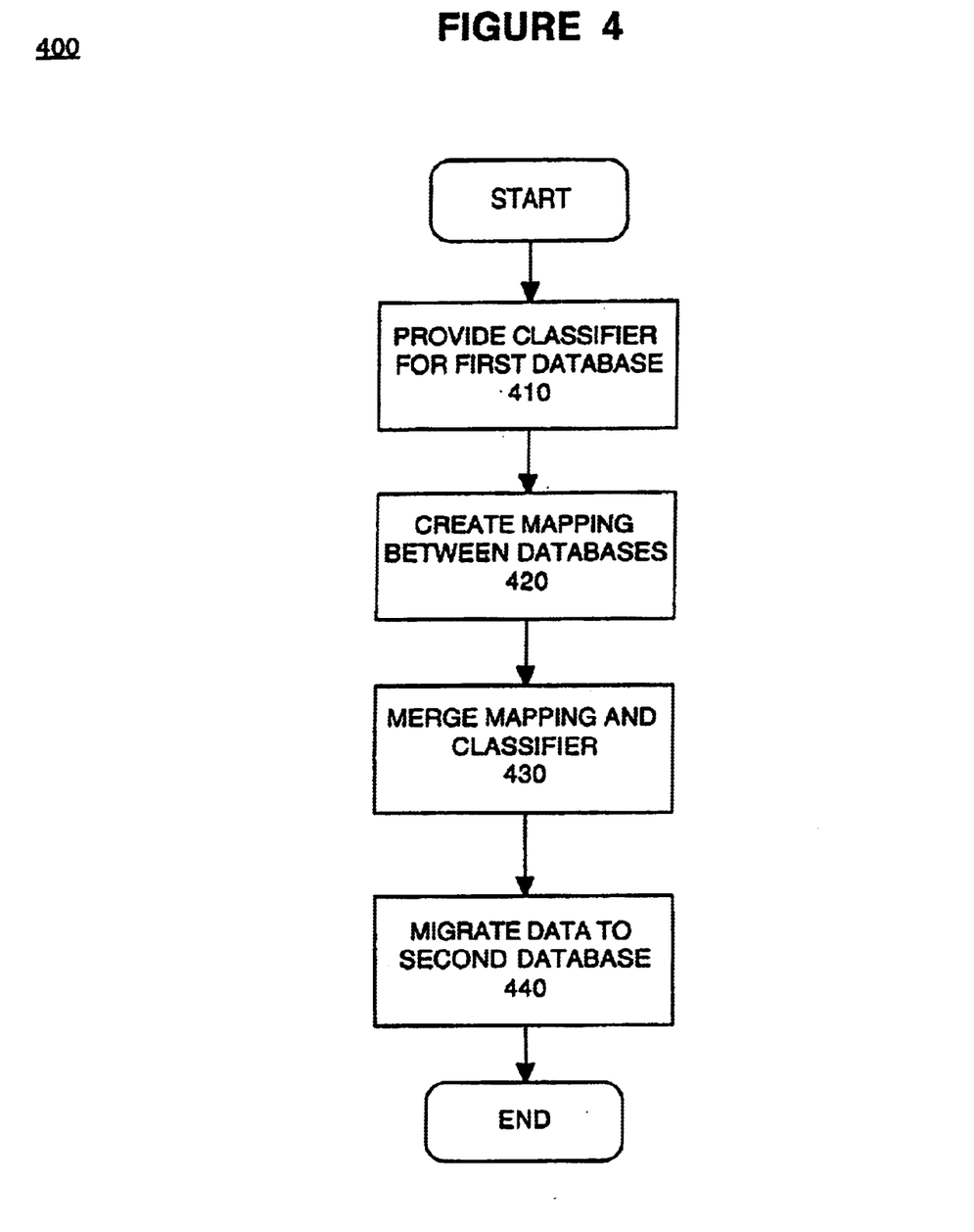
FIG. 4 is a flowchart showing the steps involved in a method 400 for migrating data from one categorization hierarchy to another hierarchy in accordance with one embodiment of the present invention.

With reference to FIG. 3 and to step 410 of FIG. 4, a classifier 332 is provided for a first hierarchy 305. Classifier 332 is a method such as using a set of rules, parameters, or a model to determine which particular category or categories in a hierarchy (e.g., hierarchy 305 of FIG. 3) data (e.g., case 331) will be classified into. Again, data and/or case refers to any document, file, program, raw or processed data, or any information which may be contained in a data hierarchy.

In one embodiment, classifier 332 uses machine learning technology to develop the rules which determine how a case is classified. Machine learning, which is well known in the art, involves determining which feature attributes to observe in cases (e.g., the presence or absence of particular words or phrases in a document), and designating a training set of cases classified into categories appropriate for the domain (e.g., hierarchy 305). A connection is established linking attribute values with particular categories within the data hierarchy, forming a classifier. Subsequent cases are then categorized (e.g., FIG. 3, block 333) in the data hierarchy by the classifier according to their attribute values. The classifier 332 can be created by the user or a previously created classifier can be provided.

In step 420 of FIG. 4, with reference to FIG. 3, a mapping 320 is created which describes where a case 331 which is in hierarchy 305 will be placed in a second hierarchy 310. For each category in hierarchy 305, a corresponding category or set of categories in hierarchy 310 is determined. Conversely, for each category in hierarchy 310, the source category or categories in hierarchy 305 are determined. The mapping 320 may contain additional information, such as conditions (e.g. the presence of particular keywords in a document) and probabilities detailing the links between categories in hierarchy 305 and those in hierarchy 310.

In step 430 of FIG. 4, with reference to FIG. 3, mapping 320 is merged with classifier 332 of hierarchy 305. This merged mapping and classifier 340 serves as the classifier for hierarchy 310. Additionally, multiple mappings among a plurality of hierarchies can be created so that data in hierarchy 305 can be classified into multiple hierarchies.

In step 440 of FIG. 4, with reference to FIG. 3, documents from hierarchy 305 are migrated to hierarchy 310 using the merged mapping 320 and classifier 340 to assign a case to a category 345 in hierarchy 310.

There are a variety of classification options when mapping from hierarchy 305 to hierarchy 310. If category X in hierarchy 305 maps to a single category Y in hierarchy 310, each of the cases in category X are simply assigned to category Y. If category X maps to no category in hierarchy 310, cases in category X may either be left out of hierarchy 310 entirely, or be classified as if they were new cases, at the discretion of the maintainers. This choice may be recorded with the mapping, indicating whether it is complete or partial.

If category X maps to more than one category in hierarchy 310 (e.g., categories $Y_1$ through $Y_5$), then each case in category X needs additional work to be classified precisely. However, each of these cases need only be classified over the subset of categories to which category X maps (e.g., $Y_1$ to $Y_5$). By limiting the range of categories which these cases can be classified into, the possibility of errors in classification by humans or automatic classifiers is reduced significantly. The mapping may optionally include additional information that aids in the categorization in hierarchy 310 such as conditions which further define the range of categories cases can be classified into.

Furthermore, in situations where a category X is mapped to several categories $Y_1 \ldots Y_5$ in hierarchy 310, a probability distribution can be associated with the mapping of category X to categories $Y_1 \ldots Y_5$. This probability distribution assists users in making manual classifications by steering them to the most probable categories quickly. Probability distributions also benefit automatic classifiers because they require fewer training cases to attain a given level of accuracy. If the creator of the mapping has no particular knowledge of what the probability distribution should be when mapping X to multiple categories in the new hierarchy, then the distribution of the cases in the old hierarchy 305 can be combined with the mapping to derive a probability distribution for all categories in the new hierarchy 310; the mapping from category X to categories $Y_1 \ldots Y_5$ can then assume the normalized distribution among $Y_1 \ldots Y_5$. Attributes of a case such as a keyword (e.g., printer or operating system 1) or keyword frequency could be used to more accurately classify a case or estimate a more accurate probability distribution. Classification may become increasingly accurate as more cases are classified.

For example, if 90% of the cases from category X have been classified to category $Y_3$ and 10% to category $Y_4$, this information can be used to estimate an appropriate probability distribution over $Y_1 \ldots Y_5$.

The result of this method is that a user can migrate documents from hierarchy 305 to hierarchy 310 without having to invest the effort and resources create a new classifier. The present invention, using the merged mapping and classifier 340, acts as the classifier for hierarchy 310 instead. Additionally, any updates made in hierarchy 305 (e.g. newly classified, deleted, or moved items) will be reflected in hierarchy 310 by the merged mapping and classifier 340 of the present invention.

In this embodiment, the present invention can also act as a virtual classifier for a collection of hierarchies. Using this virtual classifier, multiple mapped hierarchies existing side by side in an organization can be updated if a case classification is made in any hierarchy (e.g., adding, moving, or deleting a case). For example, a new case classified in one hierarchy can be classified in the other hierarchies using the appropriate merged mapping and classifier. If one master hierarchy has a classifier and the mappings from that hierarchy to the others are in place, classifiers for the other hierarchies do not need to be constructed. Case classification changes for all of the hierarchies (e.g., adding, deleting, changing, or moving a document) would only have to be made to cases in the master hierarchy. Classifications are reflected in updates to the mapped hierarchies, some of which may be done automatically. Alternately, there may be no designated master, and mappings from each to the others (or bi-directional mappings) may be employed.

Figure 5A:
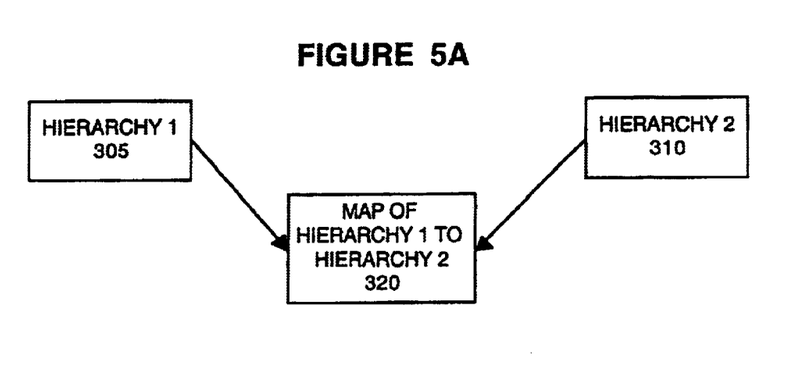
FIGS. 5A an 5B are block diagrams showing various components involved in deriving a classifier for one categorization hierarchy from another in accordance with another embodiment of the present invention.

FIGS. 5A an 5B are block diagrams showing various components involved in deriving a classifier for one categorization hierarchy from another in accordance with another embodiment of the present invention. For purposes of clarity, the following discussion will utilize the block diagrams of FIGS. 5A and 5B in conjunction with flow chart 600 of FIG. 6, to clearly describe another embodiment of the present invention. As will be described in detail below, the method of the present invention deals with efficient migration from one categorization hierarchy to another hierarchy.

Figure 6:
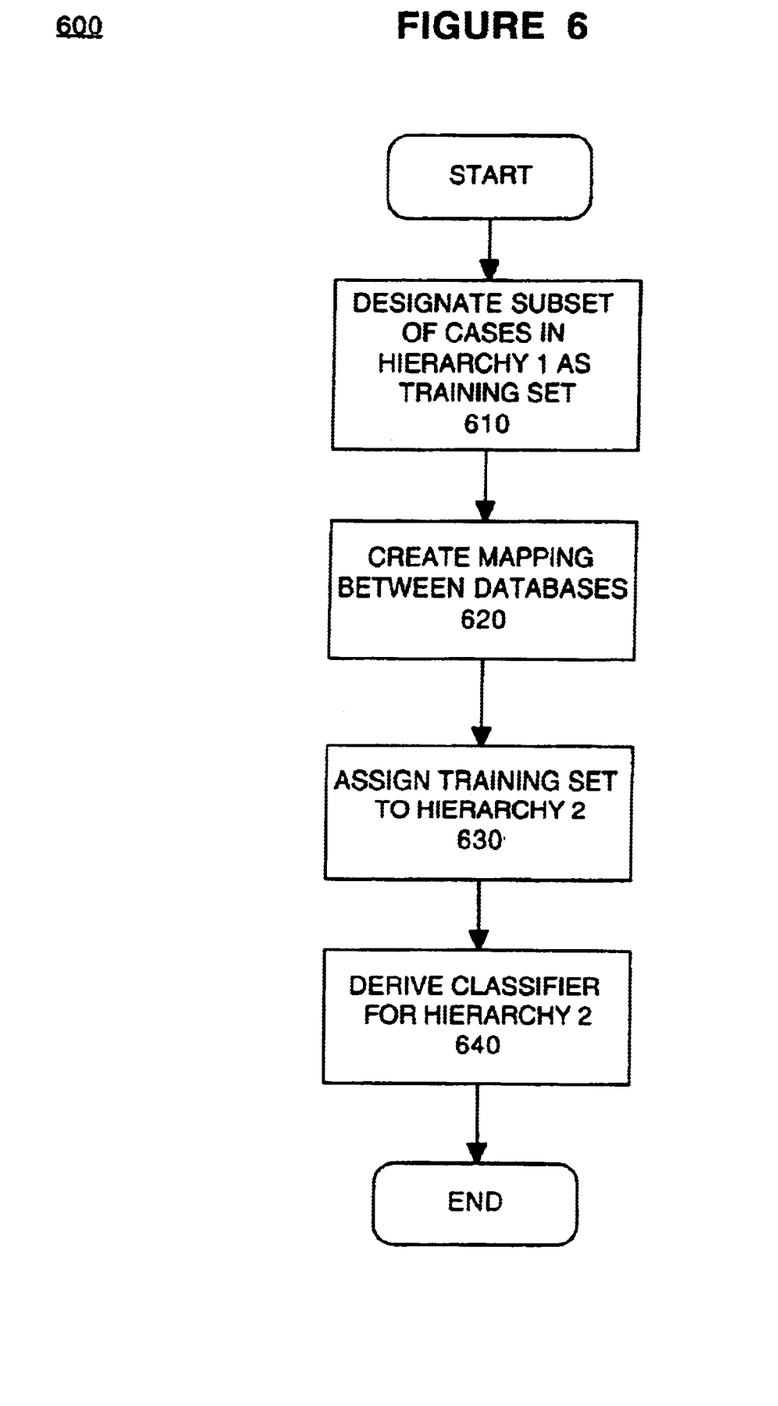
FIG. 6 is a flowchart showing the steps involved in a method 600 for deriving a classifier for one categorization hierarchy from another in accordance with one embodiment of the present invention.

With reference to FIG. 5A and to step 610 of FIG. 6, a subset of cases in hierarchy 305 are designated as a training set 360. Each case in training set 360 is previously assigned to one category in hierarchy 305.

Figure 5B:
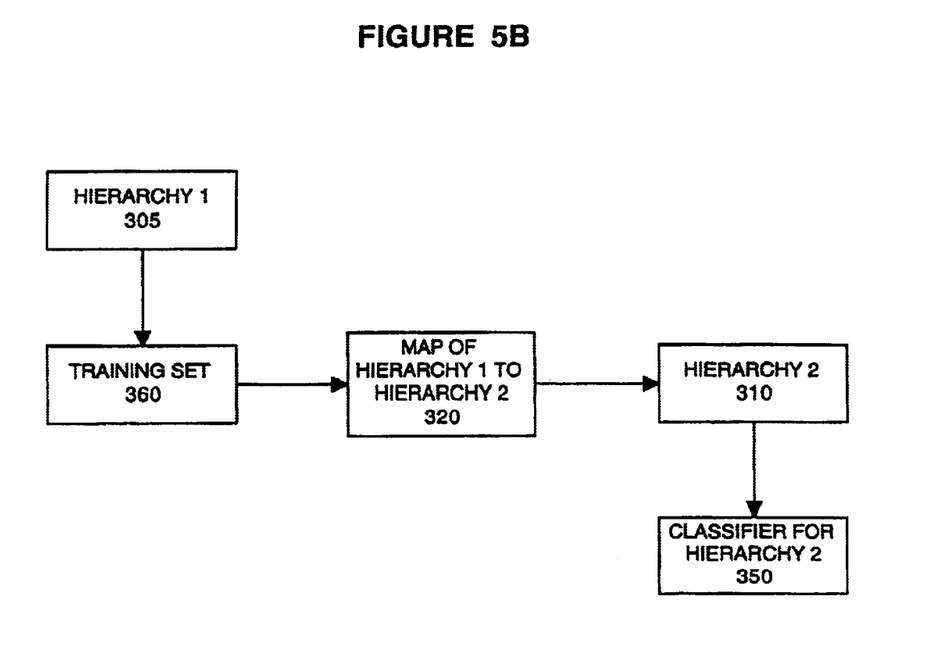

In step 620 of FIG. 6 with reference to FIGS. 5A and 5B, a mapping 320 is created which describes where a case from training set 360 will be placed in hierarchy 310. For a category in hierarchy 305, a corresponding category or set of categories in hierarchy 310 is determined based on mapping 320.

In step 630 of FIG. 6 with reference to FIG. 5B, the training set 360 of cases is migrated to hierarchy 310 using the mapping 320 to place the cases into categories within hierarchy 310, possibly including some indication of uncertainty such as probability distributions.

In step 640 of FIG. 6 with reference to FIG. 5B, a classifier 350 for hierarchy 310 is derived from the mapped training set 360 using machine learning technology. The classifier 350 establishes a connection between the attributes of a given case from training set 360 and the category assignment for that case in hierarchy 310. Subsequent cases can be placed in hierarchy 310 by classifier 350 according to their similarity to training set cases.

The result of this method is that a user can automatically categorize a case in hierarchy 310 without having to manually create a new classifier for hierarchy 310. The present invention, using machine-learning technology, generates a classifier which can be used to classify cases subsequently added to hierarchy 310.

Figure 7:
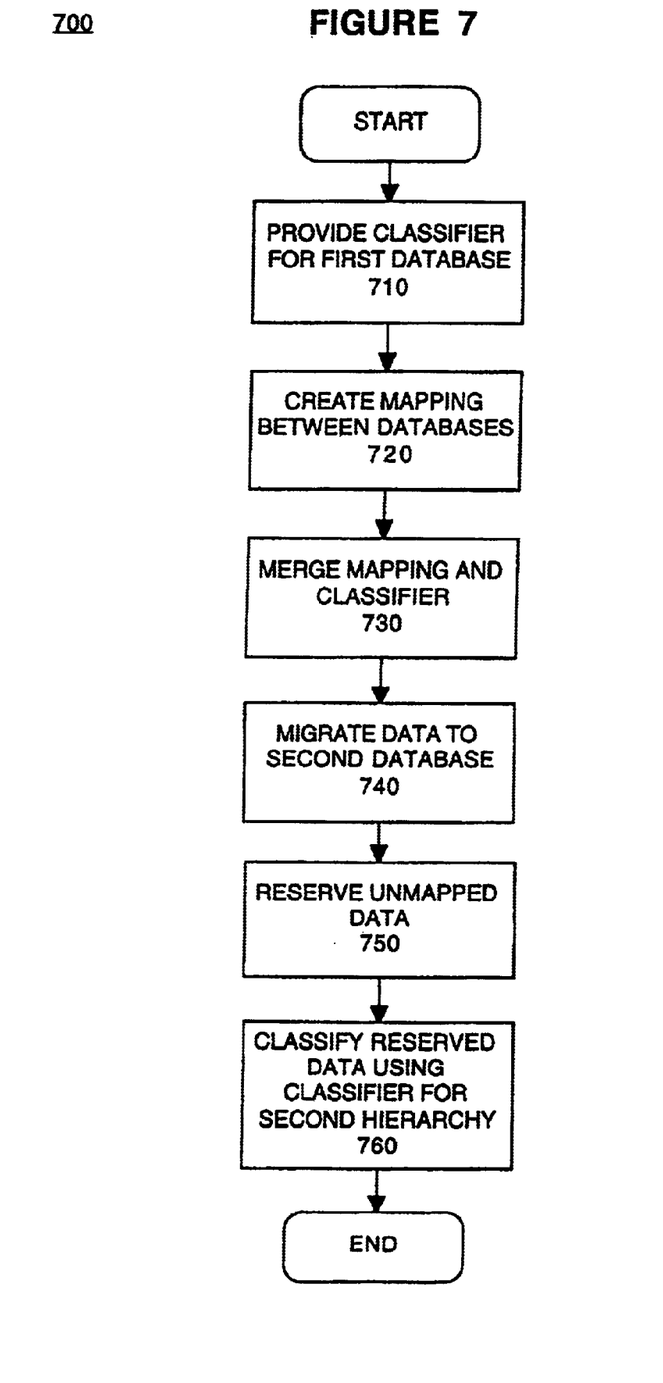
FIG. 7 is a flowchart showing the steps involved in a method 700 for migrating data from one categorization hierarchy to another hierarchy in accordance with one embodiment of the present invention.

FIG. 7 is a flowchart of a method for migrating data from one categorization hierarchy to a second hierarchy in accordance with embodiments of the present invention. For purposes of clarity, the following discussion will utilize the block diagrams of FIGS. 3, 5A, and 5B in conjunction with flow chart 700 of FIG. 7, to clearly describe another embodiment of the present invention. As will be described in detail below, the method of the present invention deals with efficient migration from one categorization hierarchy to another hierarchy.

In step 710 of FIG. 7 with reference to FIG. 3, a classifier 332 is provided for hierarchy 305. Classifier 332 is a set of rules or some other method (e.g., parameters, or a model) which determines where in a hierarchy (e.g., hierarchy 305 of FIG. 3) cases (e.g., case 331) are to be placed. The classifier can be created by the user or a previously created classifier can be used.

In step 720 of FIG. 7 with reference to FIG. 3, a mapping 320 is created which describes where a case 331 which is in hierarchy 305 will be placed in hierarchy 310. The mapping 320 links a category or set of categories in hierarchy 305 to a corresponding category or set of categories in hierarchy 310. Conversely, for each category in hierarchy 310, the source category or categories in hierarchy 305 are determined. The mapping 320 may include additional information such as conditionals or probabilities. Optionally, for some categories in hierarchy 305, the mapping 320 may not specify a corresponding category in hierarchy 310 (cases in these categories may be excluded from hierarchy 310 or may need to be classified in hierarchy 310 as if they are new cases)

In step 730 of FIG. 7 with reference to FIG. 3, mapping 320 is merged with classifier 332 of hierarchy 305. This merged mapping and classifier 340 serves as the classifier for hierarchy 310. Additionally, multiple mappings between multiple hierarchies can be created so that data in hierarchy 305 can be classified into multiple hierarchies.

In step 740 of FIG. 7 with reference to FIG. 3, cases from hierarchy 305 are migrated to hierarchy 310 using the merged mapping and classifier 340 to assign a case 331 to a category 345 in hierarchy 310.

In step 750 of FIG. 7 with reference to FIG. 3, cases from hierarchy 305 which do not have a specific mapping to hierarchy 310 are reserved for subsequent classification. These cases may not map to a specific category in hierarchy 310 or may map to numerous categories in hierarchy 310.

In step 760 in FIG. 7 with reference to FIG. 5B, the cases reserved in step 750 are classified using a classifier 350 for hierarchy 310 previously created using method 600.

Thus, the present invention provides, in various embodiments, a method for efficient migration of data from one categorization hierarchy to another hierarchy. The present invention further provides a method of allowing updates to be sent among multiple mapped hierarchies when changes are made to one hierarchy, or when items are categorized in one hierarchy.

The foregoing descriptions of specific embodiments of the present invention have been presented for purposes of illustration and description. They are not intended to be exhaustive or to limit the invention to the precise forms disclosed, and obviously many modifications and variations are possible in light of the above description. The embodiments were chosen and described in order to best explain the principles of the invention and its practical application, to thereby enable others skilled in the art to best utilize the invention and various embodiments with various modification as are suited to the particular use contemplated. It is intended that the scope of the invention be defined by the claims appended hereto and their equivalents.

What is claimed is:

1. A method of migrating data between hierarchical databases comprising:
   providing a classifier for a first hierarchical database containing data;
   creating a mapping between said first hierarchical database and a second hierarchical database, wherein said mapping describes how said data which is contained within said first hierarchical database is to be organized within said second hierarchical database;
   merging said mapping between said first hierarchical database and said second hierarchical database with said classifier for said first hierarchical database; and
   migrating said data from said first hierarchical database to said second hierarchical database, wherein said merged mapping is used as the classifier for said second hierarchical database.

2. The method of claim 1, wherein said classifier for said first hierarchical database utilizes machine learning technology.

3. The method of claim 1, wherein a plurality of said merged mappings act as virtual classifiers for a plurality of mapped hierarchies.

4. A method of creating a classifier for a hierarchical database comprising:
   designating a plurality of data items organized within a first hierarchical database as a training set;
   creating a mapping between said first hierarchical database containing said data items and a second hierarchical database, wherein said mapping describes how said data items contained within said first hierarchical database are to be organized within said second hierarchical database;
   using said mapping to derive category assignment information within said second hierarchy for said data items in said training set; and
   deriving a classifier for said second hierarchical database based upon said category assignment information for said training set.

5. The method of claim 4, wherein a plurality of said derived classifiers act as virtual classifiers for a plurality of mapped hierarchies.

6. The method of claim 4, wherein said derived classifier is used to classify data subsequently migrated from said first hierarchical database.

7. The method of claim 4, wherein said method further comprises:
   providing a classifier for said first hierarchical database containing data;
   merging said mapping between said first hierarchical database and said second hierarchical database with said classifier for said first hierarchical database;
   migrating said data from said first hierarchical database to said second hierarchical database, wherein said merged mapping is used to classify data for said second hierarchical database;
   reserving data which can not be migrated by said merged mapping for subsequent classification; and
   classifying said reserved data using said derived classifier for said second hierarchy.

8. A computer system comprising:
   a bus;
   a memory unit coupled to said bus; and
   a processor coupled to said bus, said processor for executing a method of migrating data between hierarchical databases comprising:
      providing a classifier for a first hierarchical database containing data;
      creating a mapping between said first hierarchical database and a second hierarchical database, wherein said mapping describes how said data which is contained within said first hierarchical database is to be organized within said second hierarchical database;
      merging said mapping between said first hierarchical database and said second hierarchical database with said classifier for said first hierarchical database; and
      migrating said data from said first hierarchical database to said second hierarchical database, wherein said merged mapping is used as the classifier for said second hierarchical database.

9. The computer system of claim 8, wherein said first classifier for said first hierarchical database utilizes machine learning technology.

10. The computer system of claim 8, wherein a plurality of said merged mappings act as virtual classifiers for a plurality of mapped hierarchies.

11. A computer system comprising:
    a bus;
    a memory unit coupled to said bus; and
    a processor coupled to said bus, said processor for executing a method of creating a classifier for a hierarchical database comprising:
       designating a plurality of data items organized within a first hierarchical database as a training set;
       creating a mapping between said first hierarchical database containing said data items and a second hierarchical database, wherein said mapping describes how said data items which are contained within said first hierarchical database are to be organized within said second hierarchical database;
       using said mapping to derive category assignment information within said second hierarchy for said data items in said training set; and
       deriving a classifier for said second hierarchical database based upon said category assignment information for said training set.

12. The computer system of claim 11, wherein a plurality of said derived classifiers act as virtual classifiers for a plurality of mapped hierarchies.

13. The computer system of claim 11, wherein said derived classifier is used to classify data subsequently migrated from said first hierarchical database.

14. The computer system of claim 11, wherein said method further comprises:
    providing a classifier for said first hierarchical database containing data;
    merging said mapping between said first hierarchical database and said second hierarchical database with said classifier for said first hierarchical database;
    migrating said data from said first hierarchical database to said second hierarchical database, wherein said merged mapping is used to classify data for said second hierarchical database;

reserving data which can not be migrated by said merged mapping for subsequent classification; and classifying said reserved data using said derived classifier for said second hierarchy.

15. A computer-usable medium having computer-readable program code embodied therein for causing a computer system to:

provide a classifier for a first hierarchical database containing data;

create a mapping between said first hierarchical database and a second hierarchical database, wherein said mapping describes how said data contained within said first hierarchical database is to be organized within said second hierarchical database;

merge said mapping between said first hierarchical database and said second hierarchical database with said classifier for said first hierarchical database; and migrate said data from said first hierarchical database to said second hierarchical database, wherein said merged mapping is used as the classifier for said second hierarchical database.

16. The computer-usable medium of claim 15, wherein said first classifier for said first hierarchical database utilizes machine learning technology.

17. The method of claim 15, wherein a plurality of said merged mappings act as virtual classifiers for a plurality of mapped hierarchies.

18. A computer-usable medium having computer-readable program code embodied therein for causing a computer system to:

designate a plurality of data items organized within a first hierarchical database as a training set;

create a mapping between said first hierarchical database containing said data and a second hierarchical database, wherein said mapping describes how said data items which are contained within said first hierarchical database are to be organized within said second hierarchical database;

use said mapping to derive category assignment information within said second hierarchy for said data items is said training set; and derive a classifier for said second hierarchical database based upon said category assignment information of said training set.

19. The computer-usable medium of claim 18, wherein a plurality of said derived classifiers act as virtual classifiers for a plurality of mapped hierarchies.

20. The computer-usable medium of claim 18, wherein said derived classifier is used to classify data subsequently migrated from said first hierarchical database.

21. The computer-usable medium of claim 18, wherein said computer-readable program code embodied therein further causes said computer system to:

provide a classifier for said first hierarchical database containing data;

merge said mapping between said first hierarchical database and said second hierarchical database with said classifier for said first hierarchical database;

migrate said data from said first hierarchical database to said second hierarchical database, wherein said merged mapping is used to classify data for said second hierarchical database;

reserve data which can not be migrated by said merged mapping for subsequent classification; and classify said reserved data using said derived classifier for said second hierarchy.

\* \* \* \* \*